(12) United States Patent
Kim

(10) Patent No.: US 9,878,592 B2
(45) Date of Patent: Jan. 30, 2018

(54) METHOD AND SYSTEM FOR DEFOGGING OF VEHICLE

(71) Applicant: HYUNDAI MOTOR COMPANY, Seoul (KR)

(72) Inventor: Ki Mok Kim, Busan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 200 days.

(21) Appl. No.: 14/639,006

(22) Filed: Mar. 4, 2015

(65) Prior Publication Data

US 2016/0075211 A1   Mar. 17, 2016

(30) Foreign Application Priority Data

Sep. 12, 2014 (KR) .................. 10-2014-0121287

(51) Int. Cl.
*B60H 1/32* (2006.01)
*B60H 1/00* (2006.01)

(52) U.S. Cl.
CPC ..... *B60H 1/00785* (2013.01); *B60H 1/00814* (2013.01); *B60H 1/00871* (2013.01)

(58) Field of Classification Search
CPC .............. B60H 1/00371; B60H 1/323; B60H 2001/00235; F25D 21/006
USPC ....... 62/80, 93, 150, 152, 156, 244; 165/204
See application file for complete search history.

(56) References Cited

U.S. PATENT DOCUMENTS

| | | | | |
|---|---|---|---|---|
| 4,709,751 A | * | 12/1987 | Ichimaru ................. | B60S 1/54 165/204 |
| 5,653,904 A | * | 8/1997 | Adlparvar .......... | B60H 1/00785 165/43 |
| 5,701,752 A | * | 12/1997 | Tsunokawa ........ | B60H 1/00785 165/204 |
| 6,112,807 A | * | 9/2000 | Dage .................... | B60H 1/3207 165/202 |
| 6,508,408 B2 | * | 1/2003 | Kelly ................... | B60H 1/3207 236/44 C |
| 2003/0069674 A1 | * | 4/2003 | Stam ...................... | B60Q 1/143 701/36 |

(Continued)

FOREIGN PATENT DOCUMENTS

JP    1996-0009499 B1    7/1996
JP    10-2013-0013725 A    6/2013

(Continued)

OTHER PUBLICATIONS

Korean Office Action issued in Korean Patent Application No. 10-2014-0121287 dated Jun. 15, 2015.

*Primary Examiner* — Melvin Jones
(74) *Attorney, Agent, or Firm* — McDermott Will & Emery LLP

(57) ABSTRACT

A method for defogging of a vehicle includes: determining whether the defogging of the vehicle is necessary based on at least any one of an outdoor temperature, an operation state of a cooler of an air conditioner, and an operation state of a blower of the air conditioner; defogging to control an air direction mode to add or increase an air volume supplied to a window if it is determined that the defogging of the vehicle is necessary. The air direction mode is maintained in a current state if it is determined that the defogging of the vehicle is not necessary.

14 Claims, 2 Drawing Sheets

(56) References Cited

U.S. PATENT DOCUMENTS

| | | | | |
|---|---|---|---|---|
| 2003/0209022 A1* | 11/2003 | Ieda | ............... | B60H 1/3207 |
| | | | | 62/244 |
| 2007/0130972 A1* | 6/2007 | Jang | ............... | B60H 1/00785 |
| | | | | 62/186 |
| 2007/0277544 A1* | 12/2007 | Honda | ............... | B60H 1/321 |
| | | | | 62/228.3 |
| 2011/0005255 A1* | 1/2011 | Tanihata | ............ | B60H 1/00785 |
| | | | | 62/238.7 |

FOREIGN PATENT DOCUMENTS

| | | |
|---|---|---|
| JP | 2014-124960 A | 7/2014 |
| KR | 10-0821777 B1 | 4/2008 |
| KR | 10-2012-0101936 A | 9/2012 |
| KR | 10-2013-0026337 A | 3/2013 |
| KR | 2013-0021907 A | 3/2013 |

* cited by examiner

METHOD AND SYSTEM FOR DEFOGGING OF VEHICLE

CROSS REFERENCE TO RELATED APPLICATION

The present application claims the benefit of priority to Korean Patent Application Number 10-2014-0121287 filed on Sep. 12, 2014, the entire contents of which application are incorporated herein for all purposes by this reference.

TECHNICAL FIELD

The present disclosure relates to a technology for defogging of a vehicle, and more particularly, to a method and a system for defogging of a vehicle capable of radically suppressing occurrence of fog on a window while satisfying both of dew condensation outside the vehicle and heating performance of the vehicle.

BACKGROUND

A window of a vehicle gets foggy when an outdoor temperature is low and humidity is high. An auto defog system (ADS) has been provided in the vehicle recently, which uses a humidity sensor to sense whether fog occurs on the window and turns on an air conditioner to generate wind on the window to remove the fog.

However, the ADS is expensive and decreases fuel efficiency due to the use of an air conditioner.

In the winter season, fog on a vehicle window occurs due to a low dew point inside a vehicle when a temperature outside the window is low and indoor humidity is high. Further, when air blows toward the window while operating an air conditioner in a humid summer day, a temperature of the window is low, and outdoor humidity is high, the fog also occurs outside the window.

The fog occurring outside the window can be removed by operating a wiper, but the air conditioner still needs to be operated to remove the fog inside the window.

A current air conditioning apparatus is designed to automatically operate the air conditioner in a floor and defrost mode (mix mode) and a defrost only mode (DEF) to rapidly remove the fog.

However, when the air conditioner operates, fuel efficiency is degraded, and thus, passengers do not use the floor and defrost mode or the defrost only mode. However, when the air conditioner does not operate in the above modes, it is difficult to remove the excessive fog on the window.

As an evaluation result, the fog on the window easily occurs in a driver/passenger's body mode (vent mode), a driver/passenger's body and floor mode (Bi level mode), and a floor mode (FLR mode) under an air conditioner off condition, in which a considerable amount of fog occurs in the order of body and floor mode>body mode>floor mode.

The following Table 1 shows a distribution of air volume for each air direction mode and in the floor mode (FLR mode), some of air blows toward the window but in the body and floor mode (B/L) and the body mode (vent mode), the air does not blow toward a window. That is, the fog on the window may be effectively suppressed by blowing the air to the window.

TABLE 1

| MODE | Distribution of Air Volume | | |
|------|------|-----|--------|
|      | Face | Leg | Window |
| VENT | 100% | 0%  | 0%     |
| B/L  | 65%  | 35% | 0%     |
| FLR  | 10%  | 65% | 25%    |
| MIX  | 10%  | 45% | 45%    |
| DEF  | 10%  | 0%  | 90%    |

However, the body mode (VENT) and the body and floor mode (B/L), which are frequently used at the time of mainly operating the air conditioner, generate fog outside the window when the air blows toward the window. Thus, the VENT mode and B/L mode may not blow the entire wind toward the window, but blows only a small amount of air to a leg when a large amount of air is sent to a window in the winter, therefore decreasing heating performance.

The matters described as the related art have been provided only for assisting in the understanding for the background of the present disclosure and should not be considered as corresponding to the related art known to those skilled in the art.

SUMMARY

An aspect of the present inventive concept provides a method and a system for defogging of a vehicle capable of radically suppressing occurrence of fog on a window by increasing an air volume blowing to the window while satisfying both of outdoor dew condensation and heating performance.

According to an exemplary embodiment of the present inventive concept, a method for defogging of a vehicle includes determining whether the defogging of the vehicle is necessary based on at least any one of an outdoor temperature, an operation state of a cooler of an air conditioner, and an operation state of a blower of the air conditioner. An air direction mode is controlled by defogging to increase an air volume supplied to a window if it is determined that the defogging of the vehicle is necessary. An air direction mode is maintained in a current state if it is determined that the defogging of the vehicle is not necessary.

In the step of determining, it may be determined that the defogging of the vehicle is necessary when all of the outdoor temperature, the operation state of the cooler of the air conditioner, and the operation state of the blower of the air conditioner satisfy a defogging condition.

In the step of determining, it may be determined that a defogging condition is satisfied when the outdoor temperature is equal to or less than a preset temperature.

In the step of determining, it may be determined that a defogging condition is satisfied when the cooler of the air conditioner does not operate in an operation state.

In the step of determining, it may be determined that a defogging condition is satisfied when the blower of the air conditioner in an operation state is equal to or less than a preset strength.

In the step of defogging, if it is determined that the defogging of the vehicle is necessary, an air direction mode may be controlled to relatively increase the air volume supplied to the window and relatively reduce the air volume supplied to other sides.

In the step of defogging, if it is determined that the defogging of the vehicle is necessary, the air volume supplied to the window may increase and a total air volume supplied to the blower of the air conditioner may be maintained.

In the step of defogging, if it is determined that the air direction mode is a driver/passenger's body mode and the defogging of the vehicle is necessary, the air direction mode may be controlled to reduce an air volume supplied to a driver/passenger's body and increase the air volume supplied to the window.

In the step of defogging, if it is determined that the air direction mode is a driver/passenger's body mode and floor mode and the defogging of the vehicle is necessary, the air direction mode may be controlled to reduce an air volume supplied to a driver/passenger's body and a floor and increase the air volume supplied to the window.

In the step of defogging, if it is determined that the air direction mode is a floor mode and the defogging of the vehicle is necessary, the air direction mode may be controlled to reduce an air volume supplied to a floor and increase the air volume supplied to the window.

In the step of defogging, if it is determined that the defogging of the vehicle is necessary, the air direction mode may be controlled to increase the air volume supplied to the window and then if it is determined that the defogging of the vehicle is not necessary, it may return to the air direction mode before the defogging.

In the step of defogging, if it is determined that a defogging condition is dissatisfied, it may be determined that the defogging of the vehicle is not necessary.

In the step of determining, it may be determined whether the defogging of a vehicle is necessary based on at least any one of the outdoor temperature, the operation state of the cooler of the air conditioner, the operation state of the blower of the air conditioner, and a quantity of solar radiation.

According to another exemplary embodiment of the present inventive concept, a system for defogging of a vehicle includes an outdoor temperature sensor configured to measure an outdoor temperature. A cooler performs cooling. A blower supplies air. An air direction controller is configured to control an air direction to send the air supplied from the blower to an interior depending on an air direction mode. A controller is configured to determine whether the defogging of the vehicle is necessary based on at least any one of the outdoor temperature, an operation state of the cooler, and an operation state of the blower, control the air direction mode of the air direction controller to increase an air volume supplied to the window if it is determined that the defogging of the vehicle is necessary, and maintain the air direction mode of the air direction controller in a current state if it is determined that the defogging of the vehicle is not necessary.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Hereinafter, exemplary embodiments of the present inventive concept will be described with reference to the accompanying drawings.

A method for defogging of a vehicle according to an exemplary embodiment of the present inventive concept largely includes steps of determining (S10), defogging (S20), and maintaining (S30).

Figure 1:
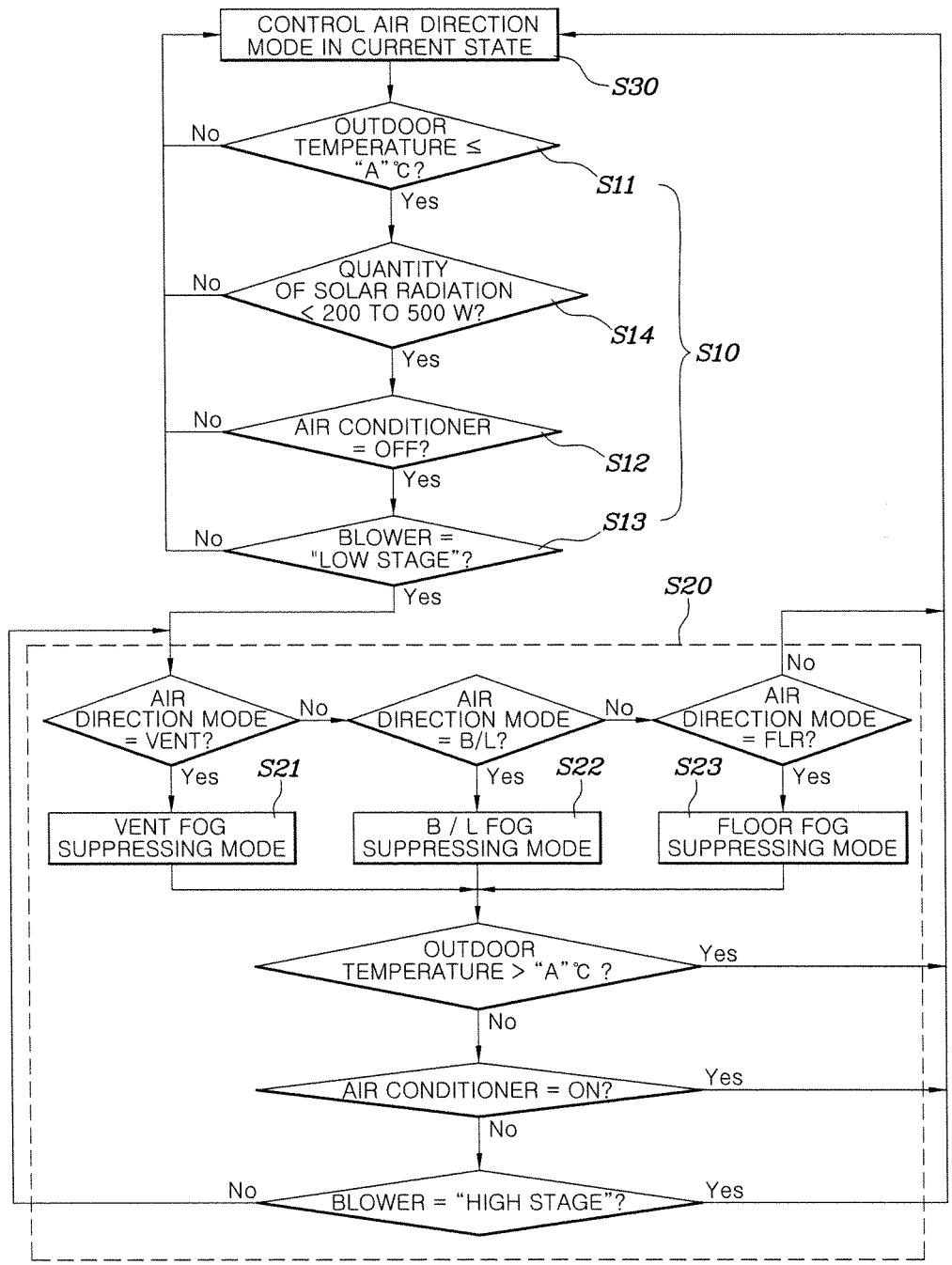
FIG. 1 is a diagram for describing a control flow of a method for defogging of a vehicle according to an exemplary embodiment of the present inventive concept.

Referring to FIG. 1, the step of determining (S10) determines whether defogging of a vehicle is required. Here, it is determined whether the defogging of the vehicle is required based on at least any one of outdoor temperature, an operation state of a cooler 20 of an air conditioning apparatus, and an operation state of a blower 30 of the air conditioning apparatus.

For example, when all of the outdoor temperature, the operation state of the cooler 20 of the air conditioning apparatus, and the operation state of the blower 30 of the air conditioning apparatus satisfy a defogging condition, it may be determined that the defogging of the vehicle is required.

Further, it may be determined whether the defogging of the vehicle is required based on at least any one of the outdoor temperature, the operation state of the cooler 20 of the air conditioning apparatus, the operation state of the blower 30 of the air conditioning apparatus, and the amount of solar radiation.

In detail, in the outdoor temperature, it is determined whether the defogging condition is satisfied when the outdoor temperature is equal to or less than a preset temperature A (S11).

When the outer temperature is equal to or less than 15 to 25° C., the outer temperature may be set to satisfy the defogging condition.

Further, when the cooler 20 is not operated under the operation state of the cooler 20 of the air conditioning apparatus, it is determined that the operation state satisfies the defogging condition (S12). Here, the cooler 20 of the air conditioning apparatus may be an air conditioner.

That is, when a large amount of solar radiation is applied to the vehicle, since an interior is hot even when the outdoor temperature is 15° C., the air conditioner operates and thus fog may not occur, but when the amount of solar radiation is small even though the outdoor temperature is equal to or less than 25° C., the air conditioner does not operate and thus fog may occur.

Therefore, since when the air conditioner is turned on, the interior is dehumidified and thus fog on a window does not occur, it is determined that the defogging condition is satisfied only in the condition that the air conditioner is turned off.

Further, when the blower 30 is equal to or less than a preset strength under the operation state of the blower 30 of the air conditioning apparatus, it is determined that the defogging condition is satisfied (S13). Here, the preset strength of the blower 30 may be a wind strength value of the air at a relatively lower stage such as 0 to 2 and 3 stages based on a 4 stage.

That is, when the outdoor temperature is low at the time of initial starting of the vehicle, indoor heating performance is more important than the suppress of fog on the window, and therefore, when the blower 30 is operated at higher stages (3 and 4 stages) to quickly increase an indoor temperature, a current air volume distribution logic is maintained as it is.

However, when the blower 30 is operated at a low stage when the indoor temperature is stabilized at a passenger desired level, it is determined that the defogging condition to increase an air volume to a front window is satisfied without deteriorating heating performance.

Finally, when amount of solar radiation does not reach a reference quantity in a rainy or cloudy day, it is determined that the defogging condition is satisfied (S14).

In the step of defogging (S20), an air direction mode is controlled to add or increase an air volume supplied to the window if it is determined in the step of determining (S10) that the defogging of the vehicle is required.

In detail, if it is determined that the defogging of the vehicle is required, the air direction mode is controlled to increase an air volume supplied to the window and to reduce the air volume supplied to other sides.

However, in the step of maintaining (S30), the air direction mode in a current state is maintained if it is not determined that the defogging of the vehicle is required. Here, the air direction mode in a current state may control an air volume based on a distribution of an air volume described in the left of the following Table 2.

That is, when the defogging condition is satisfied based on the outdoor temperature, the operation state of the air conditioner, and the operation state of the blower 30, in a driver/passenger's body mode, a driver/passenger's body and floor mode, and a floor mode as described in the right of the following Table 2, the distribution of the air volume sent to the window is increased to suppress fog on the window without operating the air conditioner, thereby improving fuel efficiency.

TABLE 2

| | Distribution of Air Volume (%) | | | | | |
| --- | --- | --- | --- | --- | --- | --- |
| | Current logic (release condition) | | | Fog suppressing logic (entry condition) | | |
| Control | Face | Leg | Window | Face | Leg | Window |
| Vent control | 100 | 0 | 0 | 75 to 60 | 0 | 25 to 30 |
| Bi-level control | 65 | 35 | 0 | 45 to 40 | 25 | 30 to 35 |
| Floor control | 10 | 65 | 25 | 10 | 55 to 50 | 35 to 40 |
| Mix control | 10 | 45 | 45 | 10 | 45 | 45 |
| DEF control | 10 | 0 | 90 | 10 | 0 | 90 |

Here, a control of the distribution of the air volume for each air direction mode in the defogging (S20) will be described in more detail with reference to the above Table 2.

First, in the step of defogging (S20), if it is determined that the defogging of the vehicle is required, the air volume supplied to the window is increased but a total air volume supplied to the blower 30 of the air conditioning apparatus is maintained. In this case, the air volume sent to the window may be variable.

For example, when it is determined that the air direction mode is the driver/passenger's body mode (VENT) and the defogging of the vehicle is required, the air direction mode is controlled to reduce the air volume supplied to the driver/passenger's body and to increase the air volume supplied to the window (S21).

As another example, when it is determined that the air direction mode is the body and floor mode (Bi-level) and the defogging of the vehicle is required, the air direction mode is controlled to reduce the air volume supplied to the body and the floor and increase the air volume supplied to the window (S22).

As another example, when it is determined that the air direction mode is the floor mode and the defogging of the vehicle is required, the air direction mode is controlled to reduce the air volume supplied to the floor and increase the air volume supplied to the window (S23).

Further, according to the exemplary embodiment of the present inventive concept, a left air direction mode and a right air direction mode of Table 2 are selected and controlled depending on the defogging.

For example, if it is determined that the defogging of the vehicle is required, the air direction mode is controlled to increase the air volume supplied to the window and then if it is determine that the defogging of the vehicle is not required, it returns to the air direction mode before the defogging.

Here, a method of determining that the defogging of the vehicle is not required determines that the defogging of the vehicle is not required when it is determined that at least any one of the outdoor temperature, the operation state of the cooler 20 of the air conditioning apparatus, and the operation state of the blower 30 of the air conditioning apparatus does not satisfy the defogging condition.

The air conditioning apparatus of the vehicle according to the exemplary embodiment of the present inventive concept largely includes an outdoor temperature sensor 10, a cooler 20, a blower 30, an air direction controller 40, and a controller 50.

Figure 2:
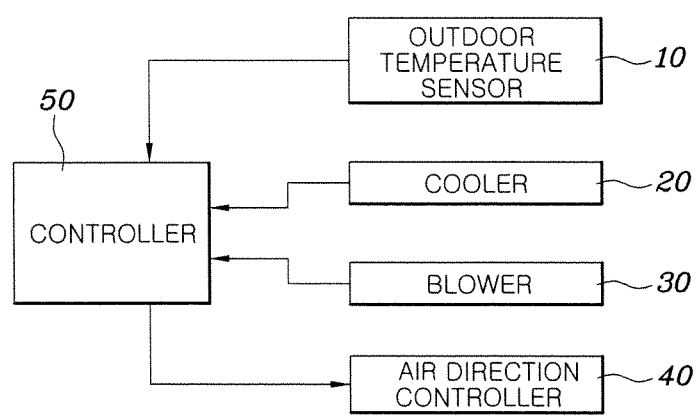
FIG. 2 is a diagram schematically illustrating a configuration of a system for defogging of a vehicle according to an exemplary embodiment of the present inventive concept.

Referring to FIG. 2, the outdoor temperature sensor 10 measures the outdoor temperature, the cooler 20 of the air conditioning apparatus performs cooling, and the blower 30 supplies air.

The air direction controller 40 allows the air supplied from the blower 30 to control an air direction sent to the interior depending on the air direction mode. Here, the air direction controller 40 may be at least one control door which is provided in the air conditioning apparatus to control the air direction and the air volume.

In particular, the controller 50 determines whether the defogging of the vehicle is required based on at least any one of the outdoor temperature, the operation state of the cooler 20, and the operation state of the blower 30. Further, if it is determined whether the defogging of the vehicle is required, the controller 50 controls the air direction mode of the air direction controller 40 to increase the air volume supplied to the window and if it is not determined that the defogging of the vehicle is required, controls to maintain the air direction mode of the air direction controller 40 in the current state.

As described above, according to the method and system for defogging of a vehicle in accordance with the exemplary embodiments of the present inventive concept, it is possible to radically prevent fog from occurring on the window by increasing the air volume to the window when the outdoor temperature and the operation state of the air conditioner and the blower 30 satisfy the defogging operation condition in which the occurrence possibility of fog is high.

Therefore, it is possible to increase marketability and customer satisfaction of a vehicle by preventing fog from occurring on a window. In particular, it is possible to improve fuel efficiency by removing fog without operating the air conditioner. Further, it is possible to apply the method and system for defogging of a vehicle to a cheap vehicle since fog may be suppressed by additionally implementing only the logic without greatly increasing vehicle cost.

Although the present inventive concept has been shown and described with respect to exemplary embodiments, it will be obvious to those skilled in the art that the present disclosure may be variously modified and altered without departing from the spirit and scope of the present disclosure as defined by the following claims.

What is claimed is:

1. A method for defogging of a vehicle, comprising steps of:
   determining whether the defogging of the vehicle is necessary based on at least any one of an outdoor temperature, an operation state of a cooler of an air conditioner, and an operation state of a blower of the air conditioner;
   defogging by controlling an air direction mode to increase an air volume supplied to a window if it is determined that the defogging of the vehicle is necessary; and
   maintaining the air direction mode in a current state if it is determined that the defogging of the vehicle is not necessary,
   wherein it is determined that the defogging of the vehicle is necessary when the cooler of the air conditioner under the operation state does not operate.

2. A method for defogging of a vehicle, comprising steps of:
   determining whether the defogging of the vehicle is necessary based on at least any one of an outdoor temperature, an operation state of a cooler of an air conditioner, and an operation state of a blower of the air conditioner;
   defogging by controlling an air direction mode to increase an air volume supplied to a window if it is determined that the defogging of the vehicle is necessary; and
   maintaining the air direction mode in a current state if it is determined that the defogging of the vehicle is not necessary,
   wherein in the step of determining, it is determined that a defogging condition is satisfied when the outdoor temperature is equal to or less than a preset temperature.

3. The method of claim 2, wherein in the step of determining, it is determined that a defogging condition is satisfied when the blower of the air conditioner under the operation state has a wind strength value of air equal to or less than a preset strength value.

4. The method of claim 2, wherein in the step of defogging, if it is determined that the defogging of the vehicle is necessary, the air direction mode is controlled to relatively increase the air volume supplied to the window and to relatively reduce an air volume supplied to other directions.

5. The method of claim 2, wherein in the step of defogging, if it is determined that the defogging of the vehicle is necessary, the air volume supplied to the window increases and a total air volume supplied from the blower of the air conditioner is maintained.

6. The method of claim 2, wherein in the step of defogging, if it is determined that the air direction mode is a driver/passenger body mode and the defogging of the vehicle is necessary, the air direction mode is controlled to reduce an air volume supplied to a driver/passenger's body and increase the air volume supplied to the window.

7. The method of claim 2, wherein in the step of defogging, if it is determined that the air direction mode is a driver/passenger body mode and floor mode and the defogging of the vehicle is necessary, the air direction mode is controlled to reduce an air volume supplied to a driver/passenger's body and a floor and increase the air volume supplied to the window.

8. The method of claim 2, wherein in the step of defogging, if it is determined that the air direction mode is a floor mode and the defogging of the vehicle is necessary, the air direction mode is controlled to reduce an air volume supplied to a floor and increase the air volume supplied to the window.

9. The method of claim 2, wherein in the step of defogging, if it is determined that the defogging of the vehicle is necessary, the air direction mode is controlled to increase the air volume supplied to the window, and then, if it is determined that the defogging of the vehicle is not necessary, the air direction mode is controlled to return to an air direction mode prior to the defogging.

10. The method of claim 9, wherein in the step of defogging, if it is determined that at least one of the outdoor temperature, the operation state of the cooler, and the operation state of the blower does not satisfy a defogging condition, it is determined that the defogging of the vehicle is not necessary.

11. The method of claim 2, wherein in the step of determining, it is determined whether the defogging of the vehicle is necessary based on at least any one of the outdoor temperature, the operation state of the cooler, the operation state of the blower, and an amount of solar radiation.

12. A non-transitory computer-readable recording medium comprising computer executable instructions execution of which causes the controller to perform the method according to claim 2.

13. A system for defogging of a vehicle, comprising:
   an outdoor temperature sensor configured to measure an outdoor temperature;
   a cooler performing cooling;
   a blower supplying air;
   an air direction controller configured to control an air direction to send the air from the blower to an interior depending on an air direction mode; and
   a controller configured to determine whether the defogging of the vehicle is necessary based on at least any one of the outdoor temperature, an operation state of the cooler, and an operation state of the blower, to control the air direction mode of the air direction controller to increase an air volume supplied to a window if it is determined that the defogging of the vehicle is necessary, and to maintain the air direction mode of the air direction controller in a current state if it is determined that the defogging of the vehicle is not necessary,
   wherein the controller determines that the defogging of the vehicle is necessary when the cooler of the air conditioner under the operation state does not operate.

14. The method of claim 2, wherein in the step of determining, it is determined that the defogging of the vehicle is necessary when all of the outdoor temperature, the operation state of the cooler, and the operation state of the blower satisfy a defogging condition.

* * * * *